United States Patent [19]
Griffith

[11] 3,896,923
[45] July 29, 1975

[54] SCREW FEEDER

[75] Inventor: John M. Griffith, Ponca City, Okla.

[73] Assignee: Continental Oil Company, Ponca City, Okla.

[22] Filed: Feb. 6, 1974

[21] Appl. No.: 440,100

[52] U.S. Cl. .................. 198/214; 198/213; 198/217
[51] Int. Cl. ............................................ B65g 33/14
[58] Field of Search ..................... 198/213, 214, 217

[56] References Cited
UNITED STATES PATENTS

| | | | |
|---|---|---|---|
| 1,867,245 | 7/1932 | Bailey | 198/213 |
| 2,112,848 | 4/1938 | Jackson | 198/214 |
| 2,663,405 | 12/1953 | Messing | 198/213 |
| 3,602,552 | 8/1971 | Morgan | 198/213 |

FOREIGN PATENTS OR APPLICATIONS

| 1,046,157 | 7/1953 | France | 198/217 |
|---|---|---|---|

Primary Examiner—Evon C. Blunk
Assistant Examiner—Jeffrey V. Nase
Attorney, Agent, or Firm—William J. Miller

[57] ABSTRACT

An apparatus for feeding a powdered compactible material into a system which is under controlled atmosphere is made from an elongated tube having an input positioned at one end and an output positioned at the other end. A shaft is axially positioned inside the tube and extends past the ends of the tube. A sealed bearing is attached to each end of the tube and supports the shaft. A screw is formed around the shaft such that the pitch of the flights on each side of the input is greater than the pitch of the flights directly over the input and the flights between the output and its corresponding end are in the reverse direction so that material being fed to the input will be advanced toward the output when the shaft is rotated in the proper direction. The closeness of the flights over the input will prevent compacting of the material. The direction of the flights at each end will prevent accumulation of material which may damage the seal or the shaft.

6 Claims, 1 Drawing Figure

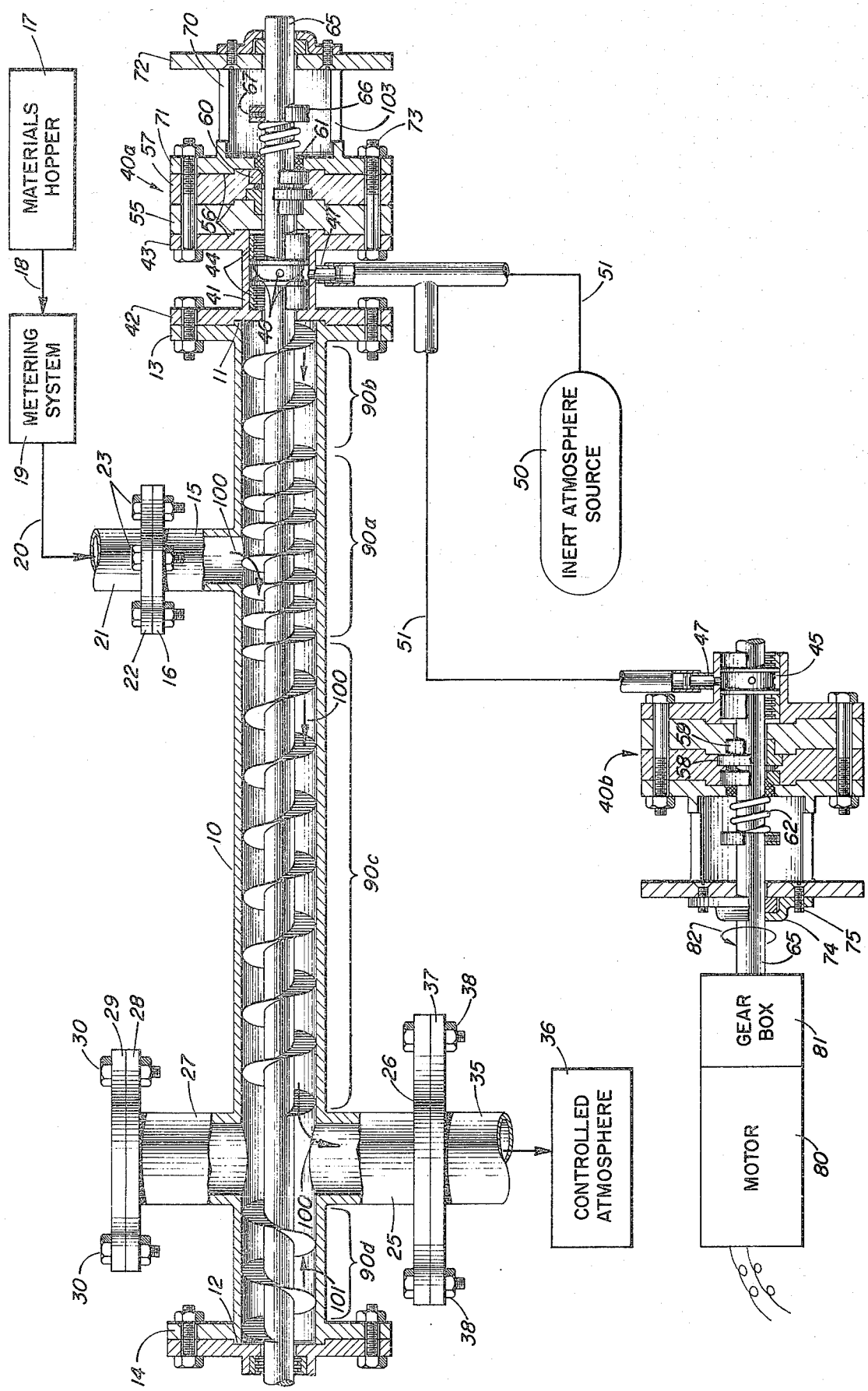

3,896,923

SCREW FEEDER

BRIEF DESCRIPTION OF THE PRIOR ART

Previous devices incorporating methods for handling powdered material failed for several reasons. In the case of powdered material, such as aluminum powder, the very small particles of aluminum penetrate the bearings and seals, resulting in failure and leak hazards. The aluminum powder also has the property of agglomeration that will actually produce large pieces of aluminum material from powder when trapped between two rubbing or moving surfaces. The agglomeration of aluminum material resulted in plugging of the feed apparatus. Such a device as a vibrating screw-type feeder, for example, failed because of an aluminum agglomeration and seal damage.

FEATURES OF THIS INVENTION

The feed device of this invention is constructed to prevent powdered aluminum or other material being fed, from entering bearings and seals as well as preventing internal packing or agglomeration of the material being fed. The above is accomplished by designing all internal parts with wide clearances. The screw flights are made so as not to trap material being fed at either end of the feeder. The screw flights are also designed to prevent packing of the material.

BRIEF DESCRIPTION OF THE FIGURE

The FIGURE illustrates the feeding apparatus showing the housing in cross-sectional view with a partial full view of the bearings and a full view of the screw and shaft.

DETAILED DESCRIPTION OF THE INVENTION

Referring to the drawing, a tube 10 has a first end 11 and a second end 12. A flange 13 is attached to end 11 and a flange 14 is attached to end 12. An inlet pipe 15 is attached to tube 10 toward the end 11 by any means such as welding. Pipe 15 likewise has a flange 16 at its terminus. A material hopper 17 is connected through a conveyor 18 to a metering system 19, for example, which is then conveyed through a pipe or other means 20 to pipe 21 which is connected through a flange 22 to flange 16. Flange 22 is connected to flange 16 by any usual means such as bolts 23. An outlet pipe 25 is connected near the end 12 by any usual means, such as welding, and has a flange 26 at its terminus. A pipe 27 is mounted axially above outlet pipe 25 and provides a clean-out access for outlet pipe 25. A flange 28 is mounted at the terminus of flange 27 and has a cover plate 29 attached thereto by any usual means such as bolts 30. Outlet pipes 25 is connected to a second pipe 35 which may be connected to any system using the material being fed in, such as a retort or process tank or other device. The feed mechanism of this invention has been used in the manufacture of alcohols where the aluminum, for example, being fed must be metered into a retort 36 having controlled atmosphere. Pipe 35 is connected to pipe 25 by means of a flange 37. Flange 37 is attached to flange 36 by a plurality of bolts 38.

Each end 11 and 12 has attached thereto a sealed bearing assembly generally referred to by the numbers 40a and 40b. Referring to either 40a or 40b (40b is identical to 40a) the bearing assembly consists of a tube 41 having a flange 42 and 43 attached at each end. A tube 41 houses the sealing mechanism and comprises a plurality of lip seals 44. These seals are well known and are generally made of rubber and spring-biasing material. They are ring shaped and have lips which extend down to the shaft and are biased against the shaft by the spring-biasing material so that a seal is effected between tube 41 and the shaft. A grooved ring 45 has a plurality of openings 46 therethrough. A pipe 47 is mounted through tube 41 in line with the groove on ring 45. An inert atmosphere source 50 is connected through a pipe 51 to pipe 47 and provides a means for continually purging air from the seal and feeder mechanism.

A seal mounting disc 55 having alignment grooves 56 is axially mounted to flange 43. A mating seal mounting disc 57 is axially mounted to disc 55 and retains a seal 58 which is pressed into a groove 59 in disc 55 and has a rotating seal 60 butted up against seal 58 with a wedge seal 61 biased againsts seal 60 by a spring 62. A shaft 65, which extends axially through tube 10, has seal 61 in close contact with its outer periphery. A retainer ring 66 is slidably mounted around shaft 65 and against spring 62. Ring 66 is forced against spring 62 until sufficient bias is provided against wedged seal 61. A plurality of set screws 67 is then tightened to secure the position of the retainer ring 66. A tube 70 has a flange 71 and a flange 72 mounted at each end. Flanges 43, 71, and discs 55 and 57 are all retained by a plurality of bolt and nut assemblies 73. A self-aligning pillow box bearing 74 is attached by means of screws 75 to flange 72 and supports shaft 65.

A motor which may be connected through a gear box or other means 81 is mechanically coupled to shaft 65 and rotates the shaft in counterclockwise direction as indicated by arrow 82 (when facing 40b).

Mounted to shaft 65 is a plurality of screw flights. These screw flights are divided into four distinct sections. Section 90a is a plurality of flights formed on shaft 65 and in the preferred embodiment has 1-inch pitch. The flights indicated by bracket 90b have a 2-inch pitch and move the material in the same direction as flights 90a. Flights 90c likewise have a 2-inch pitch and move the material in the same direction as flights 90a and 90b. Flights 90d have a 2-inch pitch but move the material in the opposite direction compared to the movement of the material caused by the flights in 90a, b, and c.

OPERATION

The motor 80 is energized, causing shaft 65 to rotate in the direction of arrow 82. Material from hopper 17 is then fed through pipe or conveyor 18 normally to a metering system 19 through pipe 20 into pipe 21 to the inlet pipe 15. It is obvious, of course, that a metering system may not be required for some uses and is included only for a description of the usual operation of the system.

The material being conveyed to the inlet pipe 15 is dropped onto the rotating flights 90a and moved in the direction of arrows 100. If any material should work toward end 11, flights 90b will move the material toward 90a and 90c. Since 90a has a lesser pitch than flights 90b or 90c, any material falling onto these flights will also be moving toward a space having a greater volume; therefore, the material cannot become agglomerated or compressed into a solid mass.

As the material drops from the end of flight 90c into the outlet pipe 25, some material may move toward end 12, particularly during high feed rates. If such should occur, flight 90d will cause a movement of the material in the direction of arrow 101 back toward outlet pipe 25.

The feed system is particularly adaptable to one requiring the exclusion of air, for example, in the manufacture of alcohols. During the manufacture of alcohols, the powdered alumimun is fed into a reactor which forms an extremely hazardous and explosive substance. The entry of air into this environment will result in fire or explosion. The feeder herein described provides an ideal feeder for such use.

Referring to the bearing and seal assembly 40a or 40b inert atmosphere from a source 50 is provided from a pipe 51 and pipe 47 into a grooved ring 45. The lip seals 44 will exclude aluminum from moving toward ring 45 and will also exclude air from entering toward ring 45; however, since source 50 is under pressure, any leakage in either direction will cause the inert atmosphere to move in the direction of the leak. Holes or openings 46 provide communication to both sides of ring 45. Thus the inert atmosphere can flow not only in the top of the seals but also on the shaft side of the seals.

The flanges 42 and 43 and their mating flange 13, discs 55, 57, and flange 71, along with alignment grooves 56, provide an extremely high resistance flow path for air entering and inert atmosphere leaving the seal, further preventing air from entering the screw faster. The shaft 65 is further sealed during rotation by a second set of seals comprising seal 58 which is fixed to disc 55 and clamped in place by disc 57. Seal 60 is a rotating seal which rotates against the surface of seal 58. Wedge seal 61 fits tightly around shaft 65 and wedges into the underside of seal 60. Seal 61 likewise rotates with shaft 65 and is biased tightly against the underside of seal 60 by the spring 62. Retainer ring 66 provides the holding force for spring 62, thus seals 44 in combination with seals 58, 60, and 61 provide an extremely effective means of preventing air from entering into feed tube 10 and provide a means for filling the internal portion of tube 10, seals 44 and tube 41 with inert atmosphere.

Bearing 74 is a self-aligning bearing and is mounted in a manner to absolutely prevent any aluminum from entering the bearing. Any aluminum that could conceivably work its way past all of the seals above-mentioned would fall into the interior of tube 70. An opening 103 provides access for the insertion of holding screws 75 but also provides an opening for the aluminum to drop out of tube 70.

In view of the above, no aluminum can possibly damage the bearings.

An embodiment constructed and used in an alcohol plant as a means of feeding powdered aluminum into the reaction can handle 3,000 pounds of powdered aluminum per hour. When the feeder is coupled with a density read-out system and speed control, the system becomes entirely automatic.

While normally the pressure involved in most reactions is extremely low, the feeder above-described can operate with extremely high pressures, thereby providing an additional safety feature should pressure build-up take place during the reaction.

While the feeder has been specifically described for the feeding of aluminum powder, any powdered substance can be used.

While the feeder may be constructed of any material, for the feeding of aluminum it is preferred that, if carbon steel construction is employed, the interior surface be chrome-plate to provide a hard surface as well as an anti-stick quality.

Changes and modifications can be made in the structure as above-described and still be within the spirit and scope as described in the specification and appended claims.

What I claim is:

1. An apparatus for feeding a powdered compactible material into a system which is under controlled atmosphere comprising:
   a. an elongated tube having first and second ends;
   b. a shaft positioned axially inside said elongated tube between said first and second ends;
   c. first and second sealed bearing means attached respectively to said first and second ends and rotatably supporting said axially positioned shaft;
   d. an input formed through said tube and over said shaft near said first end;
   e. an output formed through said tube and under said shaft near said second end; and
   f. first and second screw flight means formed along said shaft, said first screw flight means having a selected pitch at said first end and extending into a lesser pitch beneath said input to further extend to said selected pitch at said output and said second screw flight means having selected pitch and extending from said second end to said output, said second screw flight means having a reverse pitch with respect to said first screw flight means.

2. An apparatus as described in claim 1 wherein said first and second sealed bearing means each comprises axial seal means sealingly positioned between said respective shaft end and an axial journal support means, injection means communicating with said axial seal means, and an inert gas source connected to said injection means to purge air from said seal means.

3. An apparatus as described in claim 1 wherein said screw flight means and the inside of said tube are chrome-plated.

4. An apparatus as described in claim 1 wherein the diameter of each of said screw flight means is dimensional to substantially fill the inside of said tube.

5. An apparatus as described in claim 4 wherein the pitch of said flights over said inlet is approximately 1 inch and the pitch of the remaining flights is greater than 1 inch.

6. An apparatus as described in claim 5 wherein said remaining flights have a pitch of 2 inches.

* * * * *